United States Patent
Roychowdhury et al.

(10) Patent No.: US 11,565,624 B2
(45) Date of Patent: Jan. 31, 2023

(54) DIMMABLE EXTERNAL VEHICLE LIGHTING AND METHODS OF USE

(71) Applicant: Ford Global Technologies, LLC, Dearborn, MI (US)

(72) Inventors: Rajarshi Roychowdhury, Dearborn, MI (US); Mahmoud Yousef Ghannam, Canton, MI (US); Aed M. Dudar, Canton, MI (US); Mark Eifert, Frankfurt am Main (DE)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 16/750,747

(22) Filed: Jan. 23, 2020

(65) Prior Publication Data

US 2021/0229594 A1  Jul. 29, 2021

(51) Int. Cl.
  *B60Q 1/14*  (2006.01)
  *H05B 47/11*  (2020.01)

(52) U.S. Cl.
  CPC ............. *B60Q 1/143* (2013.01); *H05B 47/11* (2020.01)

(58) Field of Classification Search
  CPC ............ B60Q 2300/314; B60Q 1/143; B60Q 1/2603; B60Q 2300/054; H05B 47/11; H05B 45/12; Y02B 20/40
  See application file for complete search history.

(56) References Cited

U.S. PATENT DOCUMENTS

| | | | |
|---|---|---|---|
| 6,587,573 B1 | 7/2003 | Stam et al. | |
| 10,530,352 B1 * | 1/2020 | Morici | H02M 3/157 |
| 2006/0177098 A1 * | 8/2006 | Stam | G06K 9/00791 |
| | | | 382/104 |
| 2010/0213847 A1 * | 8/2010 | Biondo | B60Q 1/085 |
| | | | 315/82 |
| 2010/0231602 A1 * | 9/2010 | Huang | G09G 3/3406 |
| | | | 345/589 |
| 2014/0015406 A1 * | 1/2014 | Fujiwara | B60Q 1/0023 |
| | | | 315/77 |
| 2016/0366746 A1 * | 12/2016 | van de Ven | H05B 45/20 |
| 2017/0259729 A1 * | 9/2017 | Balasundrum | G07C 5/0808 |
| 2018/0339645 A1 * | 11/2018 | Ekkizogloy | B60Q 1/08 |

FOREIGN PATENT DOCUMENTS

WO    2017023293 A1    2/2017

OTHER PUBLICATIONS

"Smart Auto Headlights Automatic lighting that guard against forgetting to turn on or off lights in tunnels." Web page <https://www.nissan-global.com/EN/TECHNOLOGY/OVERVIEW/smart_auto_headlight.html>, 2 pages, retrieved from the internet on Oct. 22, 2020.

* cited by examiner

*Primary Examiner* — Daniel D Chang
(74) *Attorney, Agent, or Firm* — Frank Lollo; Eversheds Sutherland (US) LLP (57) ABSTRACT

Dimmable external vehicle lighting and methods of use are provided herein. An example method includes determining environmental light intensity around a vehicle, determining a luminance of an external light of the vehicle, determining a difference in magnitude between the environmental light intensity and the luminance of the external light, and selectively adjusting the luminance of the external light based on the difference.

20 Claims, 4 Drawing Sheets

DIMMABLE EXTERNAL VEHICLE LIGHTING AND METHODS OF USE

FIELD OF DISCLOSURE

The present disclosure is generally directed to dimmable external vehicle lighting and methods of use, which enable reduced power consumption by the vehicle when external vehicle lighting is dimmed in response to varying environmental light intensity.

BACKGROUND

Solid-state exterior lighting for automotive applications offers significant reductions in energy requirements for cars and trucks, as well as a significant environmental impact from fuel savings. Add to that the reliability and uptime improvements, and the value proposition of LED (Light Emitting Diode) lighting becomes even greater. LEDs have been the choice for automotive interior lighting for years, particularly for signal applications. Due to recent advances in solid-state lighting, LEDs are being designed in the exterior applications as well such as headlights. The widespread adoption of solid-state light sources is taking place because of appealing attributes such as small size, robustness, long lifetime and high efficiency. Future transportation with electric vehicle (EV) ride shares and autonomous vehicles (AVs) are expected to dominate certain areas, such as, city centers, geo-defined zones, around airports, sports ground, where environmental illumination is robust (e.g., high environmental light intensity). Furthermore, some states and countries require daylight running lights for vehicles. Headlights are operated even during the daylight hours but this requirement has an associated cost component.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for selectively controlling luminance of an external light, such as a headlight, of a vehicle in response to various conditions. The systems and method described herein may also be used to selectively adjusting luminance of a plurality of elements of an internal light or display of the vehicle. The luminance of the external light could be controlled based on environmental light intensity created by natural lighting, such as the Sun. The environmental light intensity could also be caused, in part, or in whole, by artificial lighting created by infrastructural lighting such as street lights and building illumination, vehicle headlights, and the like.

The vehicle can be configured to determine a current environmental light intensity in an environment around the vehicle, and selectively adjust the luminance of the external light of the vehicle in response. For example, when a current environmental light intensity exceeds the current luminance of the external light, the external light can be dimmed. When the current environmental light intensity is below the current luminance of the external light, the luminance of the external light can be increased. In general, a determination as to whether the luminance of the external light can be adjusted can be based on a comparison between the environmental light intensity and the current luminance of the external light. Thresholding can be implemented in some instances, where the luminance of the external light is adjusted when a difference between the environmental light intensity and the luminance of the external light exceeds a threshold value. The luminance of the external light could be controlled based on geographical location. For example, if the geographical location indicates that the vehicle is traveling in a dangerous or complex geographical area, the dimming strategies disclosed herein may be ignored or postponed.

The luminance of the external light could be controlled based on factors such as a vehicle separation distance. When the vehicle is stopped behind another vehicle, the luminance of the external light could be dimmed. For example, if the vehicle is in stop and go traffic or waiting behind another car at a stop light, the head lights of the vehicle may be dimmed.

Broadly, the dimming of an external light of a vehicle during vehicle operation as disclosed herein can reduce power consumption by the external light of the vehicle compared with vehicles that operate their external lights at full power. Thus, these systems and methods can improve vehicle fuel consumption overall.

Dimmable LED light schemes as disclosed can increase the fuel efficiency of the vehicle without hardware disruption and by using the plurality of vehicle exterior sensors. In general, external lights of the vehicle can be dimmed when the vehicle exterior sensors sense an optically bright environment and to return to its normal brightness automatically once the environmental lighting is not adequate. The proposed strategy can be activated once the vehicle headlights are activated. Depending on the vehicle, activation of a dimming strategy may occur when the driver switches on the headlights, or whenever the vehicle is in a torque-ready (drive) mode, or when ambient lighting is determined to be low.

When the vehicle is operating, its location can be determined. If it is driven in a brightly-lighted city street or in a neighborhood where bright lighting is not wanted, the headlights may be dimmed at least partially. If the vehicle is driving in AV-mode, the lights may also be dimmed, because the driver may not need external lighting to see ahead of the vehicle at a far distance. The dimming strategies disclosed herein can run continuously in case the mode of operation or location-type of the vehicle changes. That is, a dimming strategy can be automatically altered if the vehicle transitions from a non-AV mode to an AV mode.

Illustrative Embodiments

Figure 1:
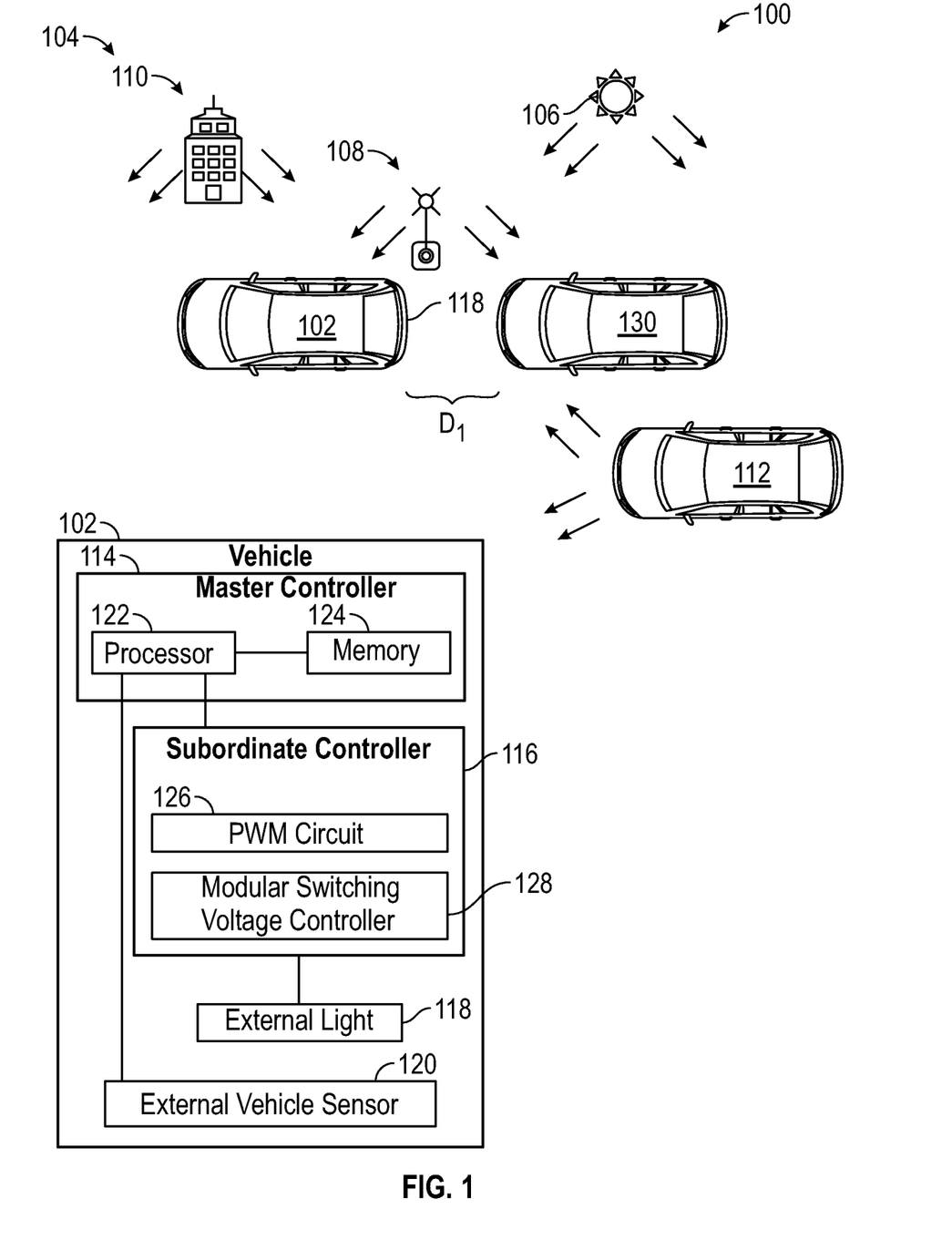
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can comprise a vehicle 102 that is operating in an environment 104. The environmental light intensity of the environment 104 can be attributed to natural and/or artificial light sources. For example, the Sun 106 can contribute to environmental light intensity to varying degrees during daytime hours. Infrastructural lighting, such as a street light 108, building lighting 110, or passing vehicle 112 lighting can contribute to environmental light intensity of the environment 104. To be sure, as the vehicle 102 moves, or as time proceeds, the environmental light intensity can change. Collectively, the arrows around each of the elements of FIG. 1 are indicative of radiating light produced by a light source.

In general, the vehicle 102 comprises a master controller 114, a subordinate controller 116, an external light 118, and an external vehicle sensor 120. To be sure, the vehicle 102 can comprise a plurality of subordinate controllers and external lights, where each of the plurality of subordinate controllers controls a specific one of the external lights (see FIG. 4 as an example).

Figure 2:
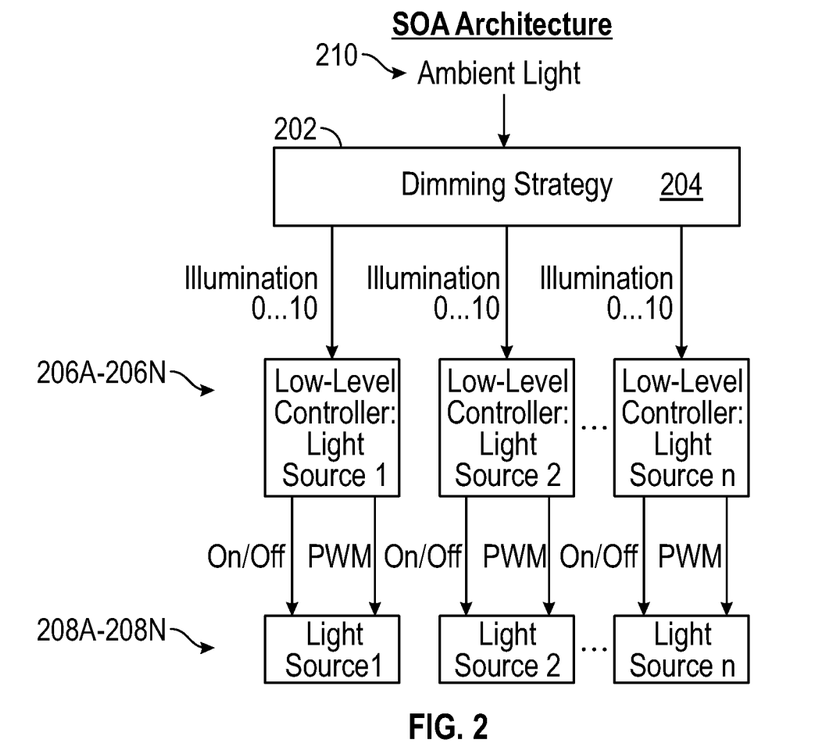
FIG. 2 illustrates an example service oriented architecture (SOA) that can be used within systems of the present disclosure.

The master controller 114 can be configured to implement a service oriented architecture (SOA) for controlling the external light 118 using the subordinate controller 116. FIG. 2 illustrates an example SOA architecture 200 of the present disclosure. The architecture 200 can comprise a master controller 202 that implements a dimming strategy 204. The master controller 202 applies the dimming strategy 204 to issue control signals to a plurality of subordinate controllers 206A-206N (e.g., low level controller for light sources). The subordinate controllers 206A-206N are each coupled to one of a plurality of light sources 208A-208N. In general, the master controller 202 receives ambient light information 210 (e.g., environmental light intensity) and adjusts the dimming strategy 204 based on a current output of each of the plurality of light sources 208A-208N in comparison with the ambient light information. Additional description related to these features is provided in greater detail infra.

Referring back to FIG. 1, the master controller 114 can comprise a processor 122 and memory 124. The memory 124 stores instructions that are executed by the processor 122 to perform aspects of environmental light intensity analysis and selective adjustment of external light operation in response. When referring to operations executed by the master controller 114 it will be understood that this includes the execution of instructions by the processor 122. To be sure, the subordinate controller 116 can also include a processor and memory, which are not illustrated for the sake of brevity of disclosure.

Environmental light intensity can be obtained by the master controller 114 from vehicle exterior sensors, such as the external vehicle sensor 120. The external vehicle sensor 120 can include any sensor that is capable of determining luminance or light intensity.

The master controller 114 can evaluate adequacy of environmental light intensity as well as aspects such as road condition and geographical area in order to generate control messages. For example, a control message is transmitted by the master controller 114 to the subsequent low level controllers, such as the subordinate controller 116. The subordinate controller 116 can determine an ON/OFF strategy where all the lights in a car are not dimmable, or determines a duty cycle for the external light 118 based on a comparison between the environmental light intensity and an output of the external light 118. The duty cycle can include a selection of PWM (Pulse Width Modulation) set points, which determine a luminous intensity of the external light 118. In general, the duty cycle for the external light based can be based on a magnitude or difference between the environmental light intensity and the current output of the external light 118. The master controller 114 can cause the subordinate controller 116 to readjust the duty cycle as the environmental light intensity changes, as will be discussed in greater detail below.

The master controller 114 can compare environmental light intensity obtained from the external vehicle sensor 120 with the output (e.g., luminance/brightness) of the external light 118. This calculated difference can be used by the master controller 114 to determine the extent to which the external light 118 can be selectively adjusted (either increasing or decreasing in luminance). If the environmental light intensity exceeds the output of the external light 118, the output of the external light 118 can be reduced (e.g., selectively adjusted) to be equal or less than the environmental light intensity.

To be sure, while the subordinate controller 116 can maintain and apply ON/OFF strategies for the external light 118, the selective adjustment of the output of the external light 118 as disclosed herein contemplates adjusting the current output of the external light 118 from a first output level to a second output level, where at least one of these output levels is not zero (completely off) or 100 (full power). In general, this is referred to as an external light dimming strategy. An example could include increasing the output of the external light 118 from 50% of full operating power (e.g., lumens) to 75% of full operating power based on a change in environmental light intensity. An example full operating lumens (also referred to as a maximum light output) could include ranges of values from 6,000 to 8,000 lumens. Other light types may have different ranges of lumen values.

It will be understood that external lights, such as LED lights operate using a rated current, which is the amount of current that needs to obtain maximum light output. An example technique that can be used to dim an LED involves calculating a PWM of the forward current powering the external light 118. The subordinate controller 116 can comprise a PWM circuit 126 and a modular switching voltage converter 128.

The basic premise is that during the "ON" cycle of the PWM circuit 126, the external light 118 is operating under optimum forward current/forward voltage conditions. As a result, the quality of light is high and the perceived brightness is linearly proportional to the duty cycle of the PWM circuit 126. The PWM circuit 126 can cooperate with the modular switching voltage converter 128 so as to function as a power supply or "driver" of the external light 118. During the ON cycle of the PWM circuit 126, the external light 118 may be powered at the recommended forward voltage/forward current operating point. The duty cycle (ratio of the pulse duration ($t_P$) to a signal period (T)) of the PWM circuit 126 can be used to determine an average current and therefore a perceived or inferred luminosity of the external light 118. That is, the duty cycle is correlated to the current output or luminosity of the external light 118.

In some instances, the PWM circuit 126 can selectively adjust the external light 118 when the environmental light intensity reaches a threshold intensity. For example, the PWM circuit 126 can dim the external light 118 when the environmental light intensity exceeds approximately 1,000 lux. The threshold intensity can vary as desired. Alternatively, the duty cycle for the PWM circuit 126 can be correlated as a percentage of the environmental light intensity, with the duty cycle (and corresponding light output) varying as the environmental light intensity changes.

Figure 3:
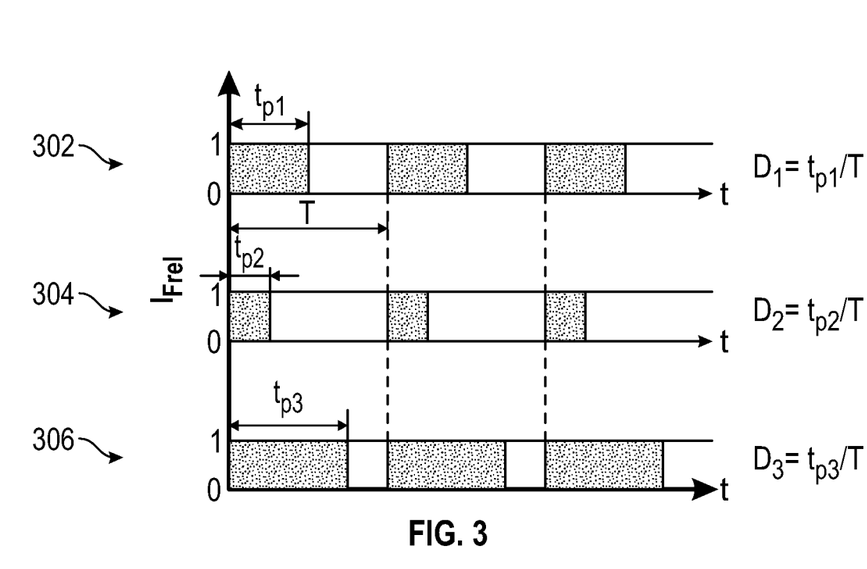
FIG. 3 illustrates various duty cycles implemented within the SOA of FIG. 2.

FIG. 3 illustrates example current pulse trains, which operate at a constant forward current. Current pulse train 302 illustrates a mid-level illumination, while the current pulse train 304 is dimmer than the current pulse train 302. The current pulse train 302 could correspond to a time of day where operation of the external light is needed, such as at dawn. A transition from the current pulse train 302 to the current pulse train 304 could occur, for example, when natural light has increased. For example, as the vehicle is operated from dawn hours to mid-day hours, the output of the external light can be decreased in response to the increase in natural light. To be sure, the methodologies described herein are adaptive to allow for the output of the external light to be adjusted in real-time or near-real-time as the environmental light intensity changes. For example, during operation, if environmental light intensity changes due to excessive cloud cover, the operation of the external light could change to increase the output of the external light. The current pulse train 306 could correspond to a time where environmental light intensity is relatively low. The current pulse train 306 results in the external light being relatively brighter than it would be using either the current pulse train 302 or current pulse train 304.

Referring back to FIG. 1, as noted above, in addition to using external sensors to determine environmental light intensity, the master controller 114 can also use data such as location data or time of day to determine environmental light intensity. For example, the master controller 114 can use GPS data to determine a location of the vehicle 102. The GPS data can also include time of day information. Some aspects of environmental light intensity can be determined or inferred based on these data, rather than (or in addition to) using direct measurements of environmental light intensity through the external vehicle sensor 120. For example, the master controller 114 can infer environmental light intensity based on the fact that the vehicle 102 is being operated at 8:00 pm. These data can be further refined by determining that the vehicle 102 is being operated in the central time zone and that the month is June. Using these data, the master controller 114 can determine that the natural light is likely correlated with nearing dusk. As the time and location change, adjustments to the output of the external light 118 can be made by the master controller 114, using the subordinate controller 116. For example, as the master controller 114 determines changes to the environmental light intensity, the master controller 114 transmits signals to the subordinate controller 116 to selectively adjust the operation of the PWM circuit 126.

The geographical location can also be used as a basis determination as to whether a dimming strategy should be implemented or not. For example, if the geographical location for the vehicle 102 indicates that the vehicle 102 is in a rural area in the mountains, the master controller 114 may postpone or delay use of the dimming strategy until the vehicle is in a safer location.

In addition to being configured to selectively adjust the dimming of an external light, such as an LED in general, some external lights may comprise a plurality of elements. For example, in FIG. 4, an example multi-element external light 400 is illustrated. The multi-element external light 400 includes a plurality of elements 402A-404F. While these elements 402A-404F are illustrated as being disposed in a linear pattern, other configurations of elements can be used. In general, the plurality of elements 402A-404F can be divided, for control purposes, in to segments. For example, elements 402A and 402B are associated with a first segment 404A, while elements 402C and 402D are associated with a second segment 404B, and elements 402E and 402F are associated with a third segment 404C. To be sure, the grouping of elements as described is merely for example purposes only and is not intended to be limiting. Thus, the number of elements and their partitioning into segments can vary as desired.

Figure 4:
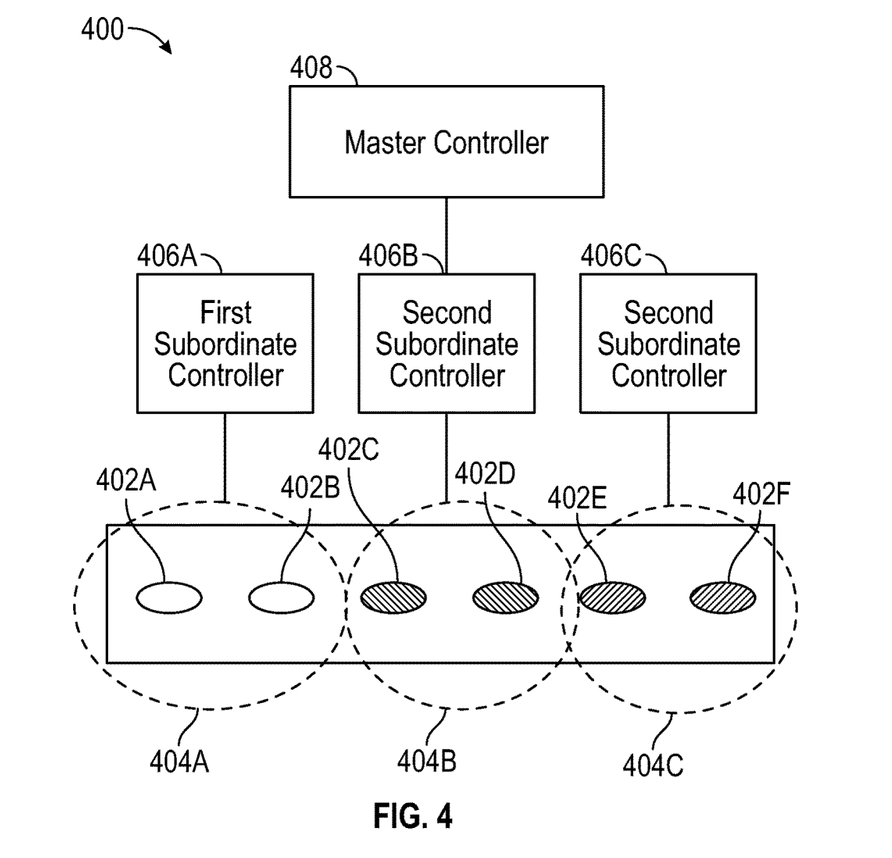
FIG. 4 is a schematic view of an example multi-element external light with individually controllable segments.

Rather than selectively adjusting or controlling a single element in response to changes in environmental light intensity, the segments and their individual elements can be controlled independently. For example, each of the segments 404A-404C can be independently controlled. In one configuration, each of the segments can be controlled using a subordinate controller. For example, the first segment 404A can be controlled using a first subordinate controller 406A, while the second segment 404B can be controlled using a second subordinate controller 406B. The third segment 404C can be controlled using a second subordinate controller 406C. Other implementations allow for each element to be controlled using individual or distinct subordinate controllers. A master controller 408 can be used to control the subordinate controller based on segmentation. The master controller 408 can be configured similarly to the master controller 114 of FIG. 1, having at least a processor and memory for implementing dimming strategies.

The master controller 408 can maintain a logical association of the subordinate controllers with their respective segments. Thus, to control the elements 402A and 402B of the first segment 404A, the master controller 408 can transmit common signals to the individual subordinate controllers assigned to each of the elements 402A and 402B. To be sure, a subordinate controller can be used to address and control a single element or multiple elements.

When the external light 400 includes multiple elements, the master controller 408 can be configured to implement a dimming strategy that allows for independent adjustment of luminance of one or more segments of the external light 400. That is, the master controller 408 can maintain a gradability transition between segment trips. For example, the master controller 408 can cause the first segment 404A to be dimmed to an output level of 75%, while the second segment 404B is dimmed to 50% and the third segment 404C is dimmed to 25%. These percentages are measured relative to a full power output of the elements.

This gradation can be implemented by the master controller 408 using a ramp function. The ramp function allows individual subordinate controllers, when given these setpoints, to selectively dim their associated elements. This ramp transition gradability makes the output of the external light 400 aesthetically pleasing to pedestrians, and also provides ample luminescence without dimming all elements at once.

The master controller 408 can also be configured to apply a scaling factor to control the output of the external light when the vehicle is an autonomous vehicle. This can also include scaling a ramp function by an AV scaling factor. To be sure, operations of an autonomous vehicle do not require the same operating level for external lights compared to human drivers who rely much more extensively for external lights during vehicle operation. In one example, the AV scaling factor may further reduce or dim the external light of the vehicle by a factor of 10% when the vehicle is autonomous. Thus, if the external light is to be dimmed to 50%, the AV scaling factor would result in dimming of the external light to 60% of its full power output level.

Figure 5:
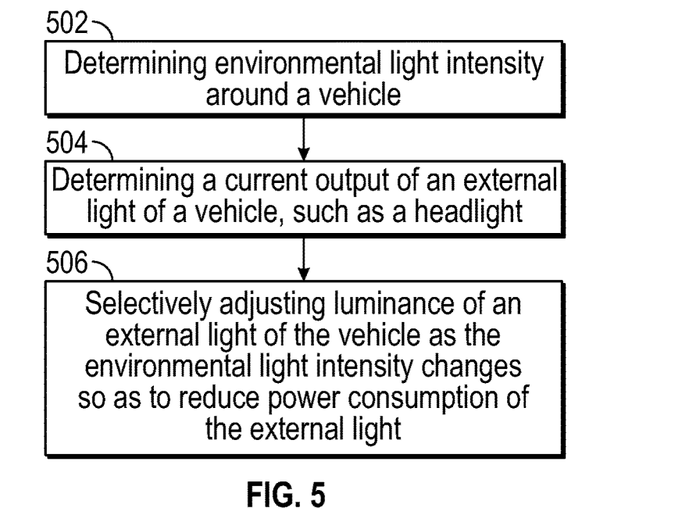
FIG. 5 is a flowchart of an example method of the present disclosure.

FIG. 5 is a flowchart of an example method of the present disclosure. The method generally includes a step 502 of determining environmental light intensity around a vehicle. As noted above, this can be accomplished using external vehicle sensors, such as a light level sensor which can measure light emitted by natural or infrastructural lighting in lux and convert the same to lumens. Additionally, the environmental light intensity can be inferred from a location of the vehicle and/or a time of day.

The method can include a step 504 of determining a current output of an external light of a vehicle, such as a headlight. This can include a direct measurement of the lumens produced by the headlight from a sensor mounted near the headlight. Alternatively, the output of the headlight can be inferred from duty cycle of the controller used to control the headlight.

Once a current environmental light intensity and current output of the headlight are known, the method can also include a step 506 of selectively adjusting luminance of an external light of the vehicle as the environmental light intensity changes so as to reduce power consumption of the external light. For example, as the environmental light intensity increases, the output of the headlight can be decreased correspondingly, and vice versa. A ruleset can be applied to prevent the headlight from being completely turned off at night or during the day if having the headlight operating during the day is required by law.

As noted above, selectively reducing the luminance of the external light can include determining a duty cycle for a controller of the external light by comparing the environmental light intensity with a current output of the external light that is indicative of the luminance of the external light. The duty cycle can be readjusted as the environmental light intensity changes.

When the headlight includes segments having a plurality of elements, the method can include determining a ramp function for dimming segments of a plurality of elements of the external light, as well as transitionally dimming the segments of a plurality of elements using the ramp function. For example, a first segment of elements can be dimmed to 75% of their full output, while a second segment of elements can be dimmed to 50% of their full output.

As noted above, the method can include determining a geographical location of the vehicle and a time of day. The environmental light intensity can be determined at least partially from the geographical location and the time of day.

Referring back to FIG. 1, the external light 118 of the vehicle 102 can be alternatively dimmed based on a distance between the vehicle 102 and a second vehicle 130, which is located in front of the vehicle 102. That is, the external light 118 of the vehicle 102 can be dimmed when the vehicle 102 is located a specified distance D1 from, and behind, the second vehicle 130. The specified distance D1 can be selected or can be variable. In some instances, the luminance of the external light can be reduced in proportion to the specified distance D1. For example, as the distance between the vehicle 102 and the second vehicle 130 decreases, the external light 118 can be dimmed proportionally.

Figure 6:
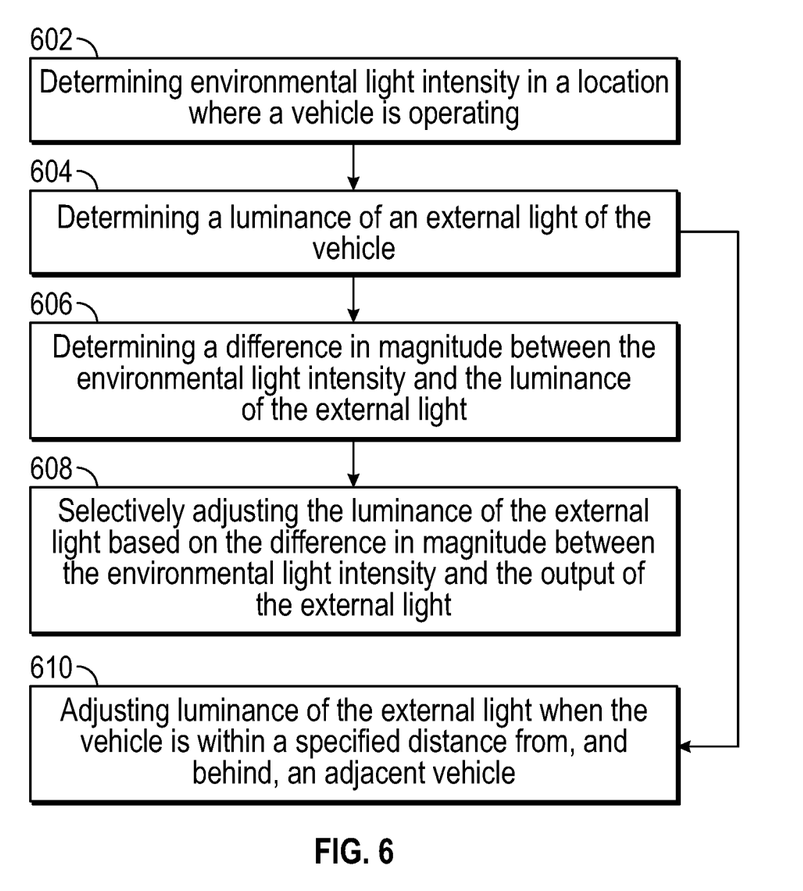
FIG. 6 is a flowchart of another example method of the present disclosure.

FIG. 6 illustrates an example method for dimming an external light of a vehicle. The method can include a step 602 of determining environmental light intensity in a location where a vehicle is operating. Next, the method can include a step 604 of determining a luminance of an external light of the vehicle. Once the environmental light intensity and the luminance of the external light are known, the method can include a step 606 of determining a difference in magnitude between the environmental light intensity and the luminance of the external light. For example, if the environmental light intensity is 2,500 lumens and the luminance of the external light is 3,500 lumens, the luminance of the external light may be dimmed to between 2,500 lumens and 3,000 lumens. When the environmental light intensity is 2,500 increases to 4,500 lumens, the luminance of the external light can be dimmed to approximately 1,500 lumens. The controller used to control the luminance of the external light is 3,500 lumens can be configured to dim or brighten the external light as a factor of the measured environmental light intensity. For example, the luminance of the external light can be set to be at or above 25% greater than the measured environmental light intensity. Thus, as the environmental light intensity changes, the luminance of the external light can be selectively adjusted to be at least 25% greater than the measured environmental light intensity.

In various instances, the determination as to how much the external light can be dimmed may be based on geographical location or time of day. If the geographical location indicates that the vehicle is operating in a dangerous area with steep curves, the external light may not be dimmed, but might be increased. The determination of the geographic location may also determine if a dimming feature is activated. For example, if the geographical location indicates that the vehicle is operating in a dangerous location, such as steep or varied terrain, or in a very crowded urban area, the master controller may not activate the selective dimming feature at all. Thus, prior to implementing a dimming strategy, the master controller may first determine that the vehicle is operating in an area that is appropriate for the dimming strategy.

The method could include a step 608 of selectively adjusting the luminance of the external light based on the difference in magnitude between the environmental light intensity and the output of the external light.

Alternatively, rather than requiring the step 606 of determining a difference in magnitude between the environmental light intensity and the luminance of the external light, as well as the step 608 of selectively adjusting the luminance of the external light based on the difference in magnitude between the environmental light intensity and the output of the external light, the method can include a step 610 of adjusting luminance of the external light when the vehicle is within a specified distance from, and behind, an adjacent vehicle. Thus, the adjustment to the luminance of the external light can be based off of a distance between adjacent vehicles. To be sure, this alternate method can be further adapted to include a comparison of environmental light intensity and the luminance of the external light as desired, such as when the vehicle may be operating in low light level conditions.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining environmental light intensity around a vehicle;
   determining a duty cycle for a controller of an external light by comparing the environmental light intensity with a current output of the external light that is indicative of the luminance of the external light, wherein the duty cycle is correlated with a percentage of the environmental light intensity; and
   selectively adjusting luminance of a plurality of elements of the external light of the vehicle as the environmental light intensity changes so as to reduce power consumption by the external light, wherein a first segment of the plurality of elements is dimmed to greater degree than a second segment of the plurality of elements.

2. The method according to claim 1, wherein the external light comprises a headlight, and wherein the headlight is configured to not completely turn off at night or during the day if use of the headlight is required by law.

3. The method according to claim 1, wherein selectively adjusting the luminance of the external light comprises:
   readjusting the duty cycle of the controller of the external light as the environmental light intensity changes, wherein the duty cycle is a ratio of a pulse duration to a signal period.

4. The method according to claim 3, wherein selectively adjusting the luminance of the external light comprises:
   determining a ramp function for dimming the segments of the plurality of elements of the external light; and
   transitionally dimming the segments of the plurality of elements using the ramp function.

5. The method according to claim 4, wherein when the vehicle comprises an autonomous vehicle (AV), the ramp function is scaled by an AV scaling factor to further dim the external light of the vehicle, wherein the AV scaling factor is based at least in part on a percentage of a full potential output level of the external light of the vehicle.

6. The method according to claim 1, further comprising determining a geographical location of the vehicle and a time of day, further comprising preventing the dimming of the luminance based on the geographical location or the time of day, wherein the geographical location comprises steep or varied terrain or a crowded area.

7. The method according to claim 6, wherein the environmental light intensity is further determined using an external vehicle sensor that is configured to measure the environmental light intensity around the vehicle, and wherein the selective adjustment of the luminance is determined based at least in part on a difference in magnitude between the environmental light intensity and the luminance.

8. A system, comprising:
   a headlight of a vehicle; and
   a light controller that controls the headlight of the vehicle, wherein the light controller comprises:
      a processor; and
      a memory for storing instructions, the processor executing the instructions to:
         determine environmental light intensity around a vehicle;
         determine a duty cycle for a controller of the headlight by comparing the environmental light intensity with a current output of the external light that is indicative of the luminance of the external light, wherein the duty cycle is correlated with a percentage of the environmental light intensity; and
         incrementally adjust luminance of a plurality of elements of the headlight as the environmental light intensity changes so as to reduce power consumption of the headlight, wherein a first segment of the plurality of elements is dimmed to greater degree than a second segment of the plurality of elements.

9. The system according to claim 8, further comprising an environmental light sensor that senses the environmental light intensity of environmental light around the vehicle, and wherein the headlight is configured to not completely turn off at night or during the day if use of the headlight is required by law.

10. The system according to claim 8, wherein the processor is configured to:
    determine when the environmental light intensity exceeds the luminance of the headlight; and
    readjust the duty cycle of the controller of the headlight as the environmental light intensity changes,
    wherein the duty cycle of the controller is a ratio of a pulse duration to a signal period.

11. The system according to claim 8, wherein the processor is configured to turn the headlight completely on or off in addition to incrementally adjusting the luminance.

12. The system according to claim 8, wherein the processor is further configured to determine a geographical location of the vehicle and a time of day, further comprising preventing the dimming of the luminance based on the geographical location or the time of day, wherein the geographical location comprises steep or varied terrain or a crowded area.

13. The system according to claim 12, wherein the vehicle comprises an autonomous vehicle (AV), a ramp function or a duty cycle of the headlight is scaled by an AV scaling factor to further dim the headlight, wherein the AV scaling factor is based at least in part on a percentage of a full potential output level of the headlight.

14. The system according to claim 8, wherein the processor is configured to:
    readjust the duty cycle of the controller of the headlight as the environmental light intensity changes,
    wherein the duty cycle of the controller is a ratio of a pulse duration to a signal period.

15. The system according to claim 8, wherein the headlight of a vehicle comprises a plurality of elements, further wherein the processor is configured to:
    determine a ramp function for dimming the segments of the plurality of elements of the headlight; and transitionally dimming the segments of the plurality of elements using the ramp function.

16. The system according to claim 15, wherein a first portion of the segments is dimmed to a luminance that is a ratio of the luminance of a second portion of the segments, and wherein the incremental adjustment of the luminance is determined based at least in part on a difference in magnitude between the environmental light intensity and the luminance.

17. A method, comprising:
  determining environmental light intensity in a location where a vehicle is operating;
  determining a luminance of an external light of the vehicle;
  selectively adjusting the luminance of the external light when the vehicle is within a specified distance from, and behind, an adjacent vehicle, or based on a comparison between the environmental light intensity and the luminance of the external light; and
  determining a duty cycle for the external light based at least in part on the comparison between the environmental light intensity and the luminance of the external light, wherein the duty cycle is correlated with a percentage of the environmental light intensity.

18. The method according to claim 17, wherein selectively reducing the luminance comprises:
  readjusting the duty cycle as the environmental light intensity changes,
  wherein the duty cycle is a ratio of a pulse duration to a signal period.

19. The method according to claim 17, wherein the luminance of the external light is reduced in proportion to the specified distance, and wherein the selective adjustment of the luminance is determined based at least in part on a difference in magnitude between the environmental light intensity and the luminance.

20. The method according to claim 17, further comprising selectively adjusting luminance of a plurality of elements of an internal light or display of the vehicle.

* * * * *